United States Patent
Blaum et al.

(10) Patent No.: US 7,388,938 B2
(45) Date of Patent: Jun. 17, 2008

(54) METHOD FOR BIT-BYTE SYNCHRONIZATION IN SAMPLING A DATA STRING

(75) Inventors: Mario Blaum, San Jose, CA (US); Richard New, San Jose, CA (US); Bruce Wilson, San Jose, CA (US)

(73) Assignee: Hitachi Global Storage Technologies-Netherlands B.V., Amsterdam (NL)

( * ) Notice: Subject to any disclaimer, the term of this patent is extended or adjusted under 35 U.S.C. 154(b) by 724 days.

(21) Appl. No.: 10/856,706

(22) Filed: May 28, 2004

(65) Prior Publication Data

US 2005/0265493 A1    Dec. 1, 2005

(51) Int. Cl.
*H04L 7/00*    (2006.01)

(52) U.S. Cl. .......... 375/354; 360/51; 360/53; 375/341; 714/701

(58) Field of Classification Search ........ 375/341, 375/350, 354; 360/53; 714/794, 795
See application file for complete search history.

(56) References Cited

U.S. PATENT DOCUMENTS

| | | | |
|---|---|---|---|
| 5,241,309 A | 8/1993 | Cideciyan et al. | 341/59 |
| 5,260,703 A * | 11/1993 | Nguyen et al. | 341/100 |
| 5,416,806 A | 5/1995 | Coker et al. | 375/354 |
| 5,485,476 A * | 1/1996 | Paranjape et al. | 714/798 |
| 5,544,180 A * | 8/1996 | Gupta | 714/798 |
| 5,619,539 A * | 4/1997 | Coker et al. | 375/341 |
| 6,089,749 A * | 7/2000 | Blaum et al. | 714/798 |
| 6,118,833 A | 9/2000 | Bergmans et al. | 375/366 |
| 6,366,418 B1 * | 4/2002 | McEwen et al. | 360/48 |
| 6,493,162 B1 | 12/2002 | Fredrickson | 360/51 |
| 6,574,756 B1 | 6/2003 | Walker et al. | 714/707 |
| 6,956,573 B1 * | 10/2005 | Bergen et al. | 345/473 |
| 7,080,313 B2 * | 7/2006 | Akiyama et al. | 714/794 |
| 2002/0150180 A1 * | 10/2002 | Malmberg et al. | 375/341 |
| 2003/0002419 A1 * | 1/2003 | Kuma et al. | 369/59.22 |
| 2003/0152175 A1 * | 8/2003 | Kuki et al. | 375/350 |

* cited by examiner

*Primary Examiner*—David C. Payne
*Assistant Examiner*—Leon-Viet Q Nguyen
(74) *Attorney, Agent, or Firm*—INCAPLAW; Terrance A. Meador (57) ABSTRACT

Bit and byte synchronization for sampling and decoding a data string is provided a single data field u. The data string x has pre-pended to it a short string of 1s (ones), followed by u to yield a string y= . . . 1111, u, x. The string is pre-coded by convolution with $1/(1 \oplus D^2)$. PRML-sampling of y starts at an initial phase, and vectors are obtained from that string by sampling at pre-selected phases following the initial sampling point. The vectors of y are compared with vectors corresponding to PRML samples of an initial set of bits in u obtained at predetermined phases. The pair of y, u vectors exhibiting the minimum Euclidian distance yields a sampling correction value by which the initial sampling phase is corrected and a new initial sampling point preceding x is determined. Here, bit and byte synchronization have been achieved and sampling of x proceeds at the corrected phase, from the new initial sampling point.

20 Claims, 5 Drawing Sheets

METHOD FOR BIT-BYTE SYNCHRONIZATION IN SAMPLING A DATA STRING

BACKGROUND OF THE INVENTION

The invention relates to data coding, and particularly to data coding for achieving bit and byte synchronization using a single data field.

Bit synchronization refers to the synchronization of a clock for receiving or reading incoming data with the data being received or read. Normally, bit synchronization is achieved when a field of, say, 1s (ones), is written as the data is stored (or transmitted) in a partial-response, maximum-likelihood sequence ("PRML") channel, and it is sampled using an acquisition loop. In a PRML channel, byte synchronization refers to a field with a data pattern in the data that marks the first bit of a symbol. For byte synchronization, this field is followed by a pattern that, when recognized, determines the start of data. Thus, data can be sampled and the information retrieved in the usual form.

As pointed out in U.S. Pat. No. 6,089,749, the conventional byte synchronization approach has the disadvantage of a long synchronization pattern, with a significant possibility of synchronization failure. The '749 patent proposes a byte synchronization scheme using a byte synchronization pattern between 16 and 18 bits in length.

Our purpose is to unify both the bit synchronization and byte synchronization fields into a single field and achieve bit and byte synchronization simultaneously using the single field ("bit-byte synchronization"). The idea is that the new field is short, allowing for significant savings in magnetic disk real estate. Alternatively, the new field can be used in a hybrid way. In order to combat events like thermal asperity (TA) that wipes out a whole synchronization field, a dual synchronization architecture has been proposed: the bit-byte synchronization field is repeated twice, so if the first bit-byte synchronization field is wiped out, then the system relies on the second one to achieve synchronization. One of the problems associated with TA is loss of both bit and byte synchronization. For that reason, it would be useful to have a synchronization field that recovers bit and byte synchronization simultaneously. Such a capability is disclosed in the following specification.

SUMMARY OF THE INVENTION

This invention combines bit and byte synchronization into a single data field u. A data string x has pre-pended to it a short string of 1s (ones), followed by u to yield a string y= . . . 1111, u, x. The string y is normally precoded by convolving it with $1/(1 \oplus D^2)$, where the symbol $\oplus$ denotes modulo 2 addition and the operator D denotes a delay of one, $D^2$ a delay of 2, etc. Thus, for a string $x_0, x_1, x_2, x_3 \ldots$ then $(1 \oplus D^2)(x_0, x_1, x_2, x_3 \ldots)$ denotes the string:

$$x_0, x_1, x_0 \oplus x_2, x_1 \oplus x_3, x_2 \oplus x_4 \ldots$$

The operation $1/(1 \oplus D^2)$ denotes the inverse of $1 \oplus D^2$. PRML-sampling of y starts at an initial phase, and vectors are obtained from that string by sampling at pre-selected phases following the initial sampling point. The vectors of y are compared with vectors corresponding to PRML samples of an initial set of bits in u obtained at predetermined phases. The pair of y, u vectors exhibiting the minimum Euclidian distance yields a sampling correction value by which the initial sampling phase is corrected and a new initial sampling point preceding x is determined. Here, bit and byte synchronization have been achieved and sampling of x proceeds at the corrected phase, from the new initial sampling point.

DETAILED DESCRIPTION OF THE PREFERRED EMBODIMENTS

Figure 1A:
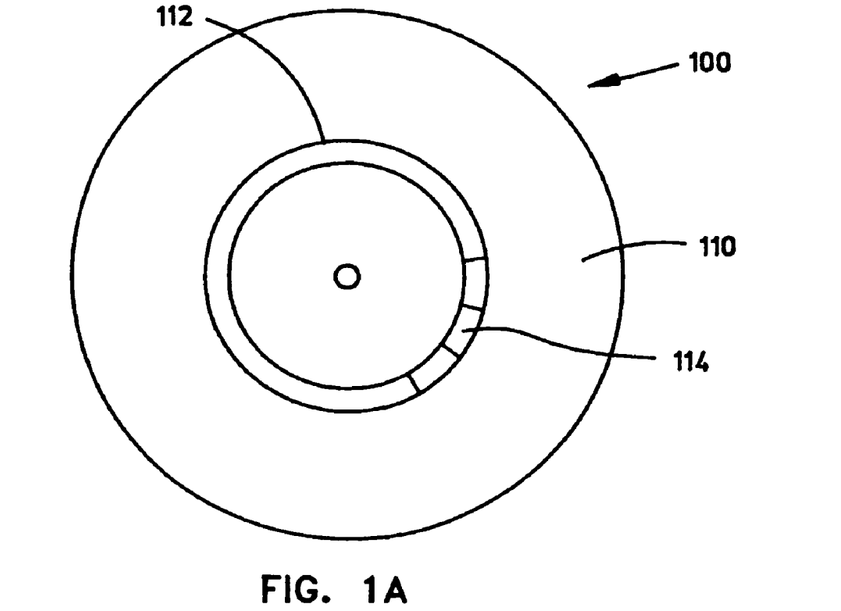
FIG. 1A is a partially schematic diagram of a magnetic disk with tracks and sectors in which data is stored.
Figure 1B:
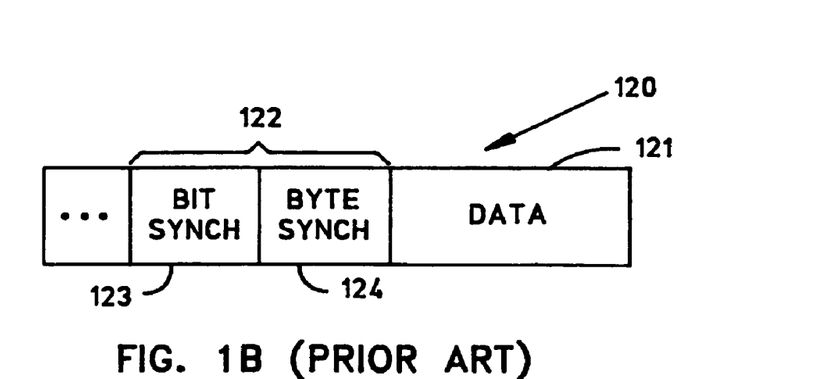
FIG. 1B is a diagram showing a prior art format of data stored on the disk with separate fields for bit and byte synchronization patterns.
Figure 2:
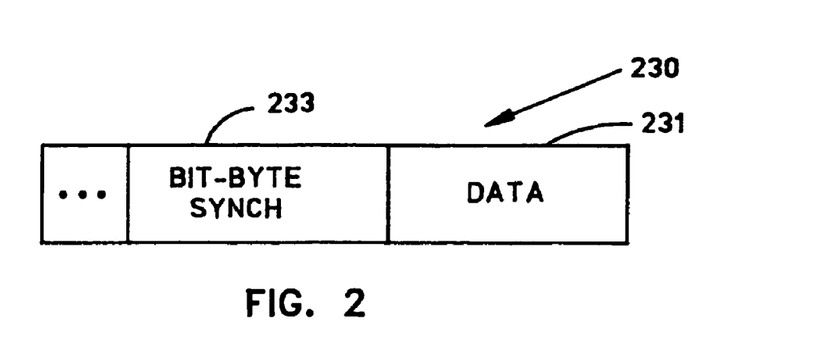
FIG. 2 is a diagram showing data stored on the disk with a single field for a bit-byte synchronization pattern.

Refer to FIGS. 1A and 1B in which a storage disk 100 has data stored on at least one surface 110 in a plurality of tracks (one of which is indicated by 112), each of which is divided into a plurality of sectors (one of which is indicated by 114). Previously, data sectors stored as shown in FIG. 1A had the format illustrated in FIG. 1B. In FIG. 1B, a data sector 120 has a data section 121 with data and a header section 122 with separate fields 123 and 124. The field 123 holds a bit synchronization pattern and the data field 124 holds a byte synchronization pattern. The invention is represented by the data string format of FIG. 2 where a data sector 130 has a data section 131 with data and a header section 132 with a single field 133 holding a single synchronization pattern for bit-byte synchronization.

In the discussion that follows, a 20-bit bit-byte synchronization pattern is set forth to illustrate certain principles. However, it will be clear to those skilled in the art that the ideas and algorithms to be presented can be adapted to a bit-byte synchronization pattern of any size.

The bit-byte synchronization pattern is preceded by a sufficient number of is such that sampling starts before the pattern is encountered. The exemplary 20-bit bit-byte synchronization pattern is:

$$u = (10110111111011011111) \qquad (1)$$

The string . . . 1111, u, x is transmitted, where x is the data. Sampling of the string starts at any moment prior to u. The idea is that once u is read, both byte synchronization and very close bit-synchronization have been achieved.

The method of bit-byte synchronization proceeds as follows. Consider the string y= . . . 1111, u, x, with u and x as described above. The first step is to precode y by convolving it with $1/(1 \oplus D^2)$, where $\oplus$ denotes modulo-2 addition. This precoded string is then sampled at an initial unknown point f using PRML. In a noiseless environment, when the first 16 bits of u, are sampled, i.e., (1011011111101101), at phases 0, 0.125, 0.25, 0.375, 0.5, 0.625, 0.75 and 0.875 respectively using PRML, the following 8 vectors are obtained (notice that precoding makes the samples of $u_0$ below coincide in absolute value with the first 16 bits of u):

$u_0 = (1, 0, -1, 1, 0, -1, 1, 1, -1, -1, 1, 0, -1, 1, 0, -1)$ $u_1 = (1.11, -0.29, -0.82, 1.12, -0.29, -0.84, 1.19, 0.78,$
$\quad -1.18, -0.76, 1.1, -0.29, -0.82, 1.12, -0.29, -0.84)$ $u_2 = (1.13, -0.57, -0.57, 1.15, -0.56, -0.61, 1.32, 0.54,$
$\quad -1.31, -0.51, 1.13, -0.57, -0.58, 1.15, -0.56, -0.62)$ $u_3 = (1.09, -0.81, -0.3, 1.1, -0.8, -0.36, 1.41, 0.27,$
$\quad -1.4, -0.21, 1.1, -0.81, -0.3, 1.12, -0.79, -0.37)$ $u_4 = (0.98, -0.99, 0, 0.99, -0.98, -0.08, 1.44, 0,$
$\quad -1.44, 0.08, 0.98, -1, 0, 1, -0.97, -0.09)$ $u_5 = (0.8, -1.11, 0.3, 0.8, -1.1, 0.21, 1.4, -0.27,$
$\quad -1.41, 0.36, 0.8, -1.12, 0.3, 0.81, -1.08, 0.2)$ $u_6 = (0.56, -1.15, 0.59, 0.57, -1.13, 0.51, 1.31, -0.54,$
$\quad -1.32, 0.61, 0.56, -1.15, 0.58, 0.57, -1.13, 0.5)$ $u_7 = (0.3, -1.12, 0.82, 0.29, -1.1, 0.76, 1.18, -0.78,$
$\quad -1.19, 0.84, 0.29, -1.12, 0.82, 0.29, -1.1, 0.76)$ Consider $m = \min\{d(u_i, u_j), 0 \leq i \leq j \leq 7\}$, where $d(u_i, u_j)$ denotes the Euclidean distance between $u_i$ and $u_j$. The 16-bit vector (1011011111101101) was chosen in such a way that it maximizes $m$. Of course other choices are possible, but this vector is the one that gives the best results with the algorithms for bit-byte synchronization to be described next. However, this is only a preferred embodiment and several others are obvious to those skilled in the art.

Figure 3:
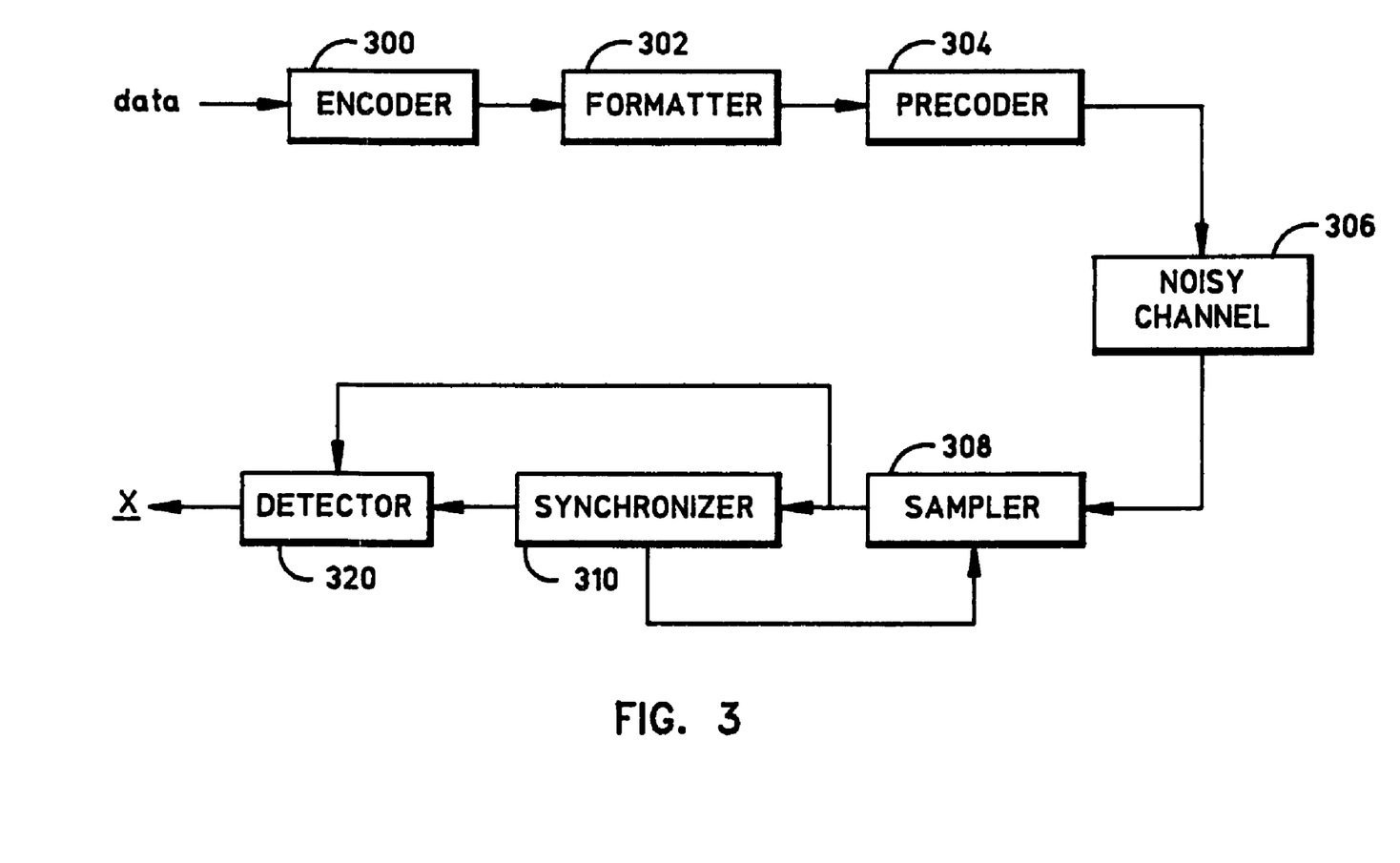
FIG. 3 is a block diagram of a data transmission system in which the method of the invention is executed.

FIG. 3 illustrates a data transmission system in which the invention may be practiced. In this regard, a data transmission system is one that communicates encoded data between two entities. The data transmission system may be, for example, a broadcast or guided wire telecommunication system. Preferably, the system is a component of a disk drive in which data is prepared for storage, stored on one or more magnetic disks, retrieved from disk storage, and processed for use. The system includes a PRML encoder 300 that receives and encodes a stream of data to produce a data stream x. The data stream is formatted by a formatter 302 into a string y, where y=1111, u, x. The string y is pre-coded by a pre-coder 304, which produces a pre-coded string $(1/(1 \oplus D^2)) \cdot y$. The pre-coded string passes through a noisy channel 306 (such as by being written to and read from one or more data storage disks) whence it is received by a sampler 308, which produces PRML samples of the now noisy pre-coded string, with sampling starting at some arbitrary point and producing a string of samples at points f, f+1, f+2, . . . before the start of u. A synchronizer 310 receives the samples and uses pre-determined samples $u_j$ of u to determine bit/byte synchronization. When synchronization is found, the synchronizer adjusts the sampling points and indicates synchronization is achieved to the sampler 308 and a PRML detector 320. The sampler adjusts and resets sampling, and the PRML detector applies PRML decoding to the adjusted sampled data to produce an estimate of the data stream x. The data stream x may then be decoded.

The synchronizer operates by implementing one of the following algorithms.

Algorithm 2.1 Assume the string . . . 1111, u, x, where u is defined in (1) and x is random data. This string is precoded by convolution with $1/(1 \oplus D^2)$ and PRML sampling of the precoded string starts at points f, f+1, f+2, . . . before the start of u, where the initial sampling point f is random and unknown. The sampled signal will be possibly subject to noise. Denote this sampled and possibly noisy signal by $v_0$, $v_1$, $v_2$, . . . Then, the algorithm proceeds as follows:

Set i←0.
BACK:
For each $0 \leq j \leq 7$, let $v_i = (v_i, v_{i+1}, \ldots, v_{i+15})$ and $d_{i,j} = d(v_i, u_j)$.
If $d_{i,j} \leq 2$ then go to NEXT, else
Set i←i+1 and go to BACK.
NEXT:
Let $m_i = \min\{d_{i,j}, 0 \leq j \leq 7\}$, and $m_{i+1} = \min\{d_{i+1,j}, 0 < j < 7\}$.
If $m_i > m_{i+1}$, then set i←i+1 and go to BACK.
Let $j_0$ be such that $m_i = d_{i,j_0}$.
Reset the phase as f←f−($j_0/8$).
Start sampling the data at sampling points f+i+20, f+i+21, f+i+22 . . . to obtain a sampled sequence w=$w_0$, $w_1$, $w_2$, . . .

Apply maximum likelihood decoding to w to obtain an estimate of x.

An example of Algorithm 2.1 is as follows.

Example 2.1

Assume the string
. . . 1111, u, x=( . . . 11111011011111011011111110 11 . . . ), where u is defined in (1). Precoding this string yields
$1/(1 \oplus D^2)$( . . . 1111,u,x)=( . . . 1100100100110010010011001100 . . . )

Next, assume that sampling starts at point 0.35 (which is unknown) and the following samples are obtained:
−0.05 −0.2 −1.34 −0.29 1.1 −0.77 −0.35 1.11 −0.76 −0.42
1.39 0.33 −1.39 −0.28 1.1 −0.77 −0.36 1.12 −0.76
−0.43 1.39 0.33 −1.39 −0.3 1.3 0.63 −0.34 −1.23
−0.6 . . .

By adding white gaussian noise with a variance of 0.06 to the samples above, for instance, the following samples may be obtained:
−0.09 −0.12 −1.37 −0.22 1.12 −0.75 −0.38 1.07 −0.74
−0.46 1.31 0.35 −1.3 −0.29 1.02 −0.86 −0.38 1.21
−0.69 −0.47 1.37 0.27 −1.37 −0.31 1.25 0.7 −0.25
−1.33 −0.57 . . . =$v_0 v_1 \ldots v_{28}$ By applying at each step the algorithm, notice that for each $0 \leq j \leq 7$ and $v_i = (v_i, v_{i+1}, \ldots v_{i+15})$, $d_{i,j} = d(v_i, u_j)$ gives:

| i | $d_{i,0}$ | $d_{i,1}$ | $d_{i,2}$ | $d_{i,3}$ | $d_{i,4}$ | $d_{i,5}$ | $d_{i,6}$ | $d_{i,7}$ |
|---|---|---|---|---|---|---|---|---|
| 0 | 9.44 | 12.78 | 16.57 | 20.83 | 25.18 | 29.27 | 33.1 | 36.33 |
| 1 | 17.13 | 13.03 | 9.56 | 6.95 | 5.4 | 4.91 | 5.61 | 7.36 |
| 2 | 47.94 | 47.08 | 44.55 | 41.28 | 36.97 | 31.81 | 26.23 | 21.01 |
| 3 | 16.24 | 21.67 | 26.96 | 32.24 | 36.85 | 40.5 | 43.16 | 44.81 |
| 4 | 4.86 | 2.03 | 0.4 | 0.1 | 1.15 | 3.5 | 7.11 | 11.62 |

It can be seen that the minimum is achieved at $d_{4,3}$. Therefore, the phase will be corrected in 3/8=0.375. Since the original (unknown) sampling point was 0.35, this sampling point is reset as 0.35−0.375=−0.025. Since i=4, sampling starts at points $f+i+20, f+i+21, f+i+22 \ldots = 23.975, 24.975,$
$\quad 25.975, \ldots$ Notice that for perfect bit-byte synchronization, it would be necessary to sample at points 24, 25, 26.

The bit-byte synchronization method described in Algorithm 2.1 provides useful results. However, even in a noiseless situation, an error of 0.06 (or 6%) is common. Although such an error is not catastrophic, the noise can easily make synchronization even more difficult. One way to make the sampling more precise is by increasing the number of comparison vectors $u_j$. In the preferred embodiment described above these vectors are obtained by sampling at skips of 0.125. Smaller sample intervals may be taken. Of course doing so would increase the complexity of the system.

Figure 4:
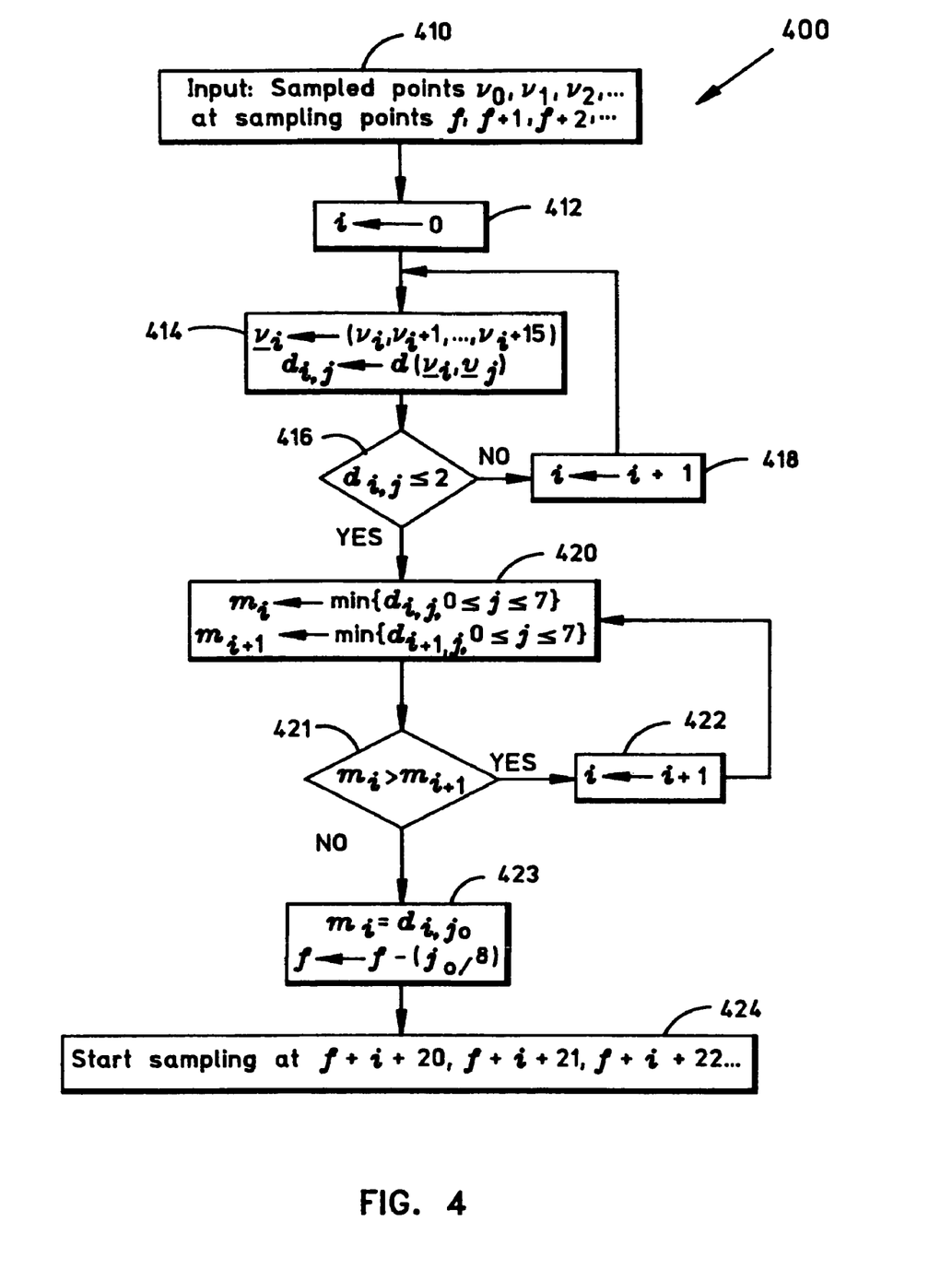
FIG. 4 is a flow diagram illustrating a first embodiment of the method of the invention.

FIG. 4 illustrates a method 400 according to Algorithm 2.1. The method is represented by a flow diagram with the understanding that it would be embodied either as a processor program comprising a series or sequence of commands executed by the synchronizer 310 of FIG. 3. Preferably, the method 400 operates on a string . . . 1111, u, x, and is preceded by pre-coding the string as discussed above, which produces the pre-coded data string y. The method begins in step 410 by sampling the string to obtain the sample vectors $v_0, v_1, v_2, \ldots$ at the sampling points f, f+1, f+2, . . . before the start of u. An iteration counter i is initialized in step 412. Then, in step 414 the Euclidian distance $d_{i,j}$ is taken between a current sample vector $v_i$ and each of eight sample vectors of u. According to the test in step 416, if the Euclidian distance $d_{i,j}$ is greater than 2, the method increments i by one and loops back through 414; otherwise, the method goes to step 420. In step 420, a first minimum Euclidian distance $m_i$ is the minimum $d_{i,j}$ calculated with $v_i$, and a second minimum Euclidian distance $m_{i+1}$ is the minimum $d_{i+1,j}$ calculated with $v_{i+1}$. The minimum $m_i$ is searched for in decision 421 by comparing the current $m_i$ with $m_{i+1}$ and, if necessary, incrementing i and looping through steps 420, 421 and 422 until the minimum $m_i$ is found. The minimum value of $m_i$ is used in step 423 to calculate a value ($j_0$/8) with which to adjust the sampling points. With the adjustment, a sampled sequence w is obtained in step 424 from which an estimate of the data string x is derived by maximum likelihood decoding.

Another alternative is to perform an interpolation process. One way to do this is to take, instead of the smallest sampled value, a number of smallest ones (for example, the three smallest ones) and interpolate between them. This process will be described in the next algorithm.

Algorithm 2.2 Assume the string . . . 1111, u, x, where u was defined in (1) and x is random data. This string is precoded by convolution with $1/(1 \oplus D^2)$. Then, PRML sampling of the precoded string starts at points f, f+1, f+2, . . . before the start of u, where the initial sampling point f is random and unknown. The sampled signal will possibly be subject to noise. Denote this sampled and possibly noisy signal by $v_0, v_1, v_2, \ldots$. Then, proceed as follows:

Set
i←0.
BACK: For each $0 \leq j \leq 7$, let $v_i = (v_i, v_{i+1}, \ldots, v_{i+15})$ and $d_{i,j} = d(v_i, u_j)$.
If $d_{i,j} \leq 2$ then go to NEXT, else,
Set i←i+1 and go to BACK.
NEXT: Consider the vector of distances of length 16:

$$\underline{d} = (d_{i+1,0}, d_{i+1,1}, \ldots, d_{i+1,7}, d_{i,0}, d_{i,1}, \ldots, d_{i,7})$$
$$= (d_0, d_1, \ldots, d_{15})$$

Now, consider l, $0 \leq l \leq 13$ such that $d_l, d_{l+1}, d_{l+2}$, are the smallest values in d (without loss of generality, it may be assumed that these three values are consecutive, although this assumption is not necessary to the operation of the algorithm). Consider the vector of length 16:

$$a = (0, 0.125, 0.25, \ldots, 0.875, 1, 1.125, \ldots, 1.875)$$
$$= (a_0, a_1, \ldots, a_{15})$$

Let $$r = \frac{d_{l+1}d_{l+2}a_l + d_l d_{l+2}a_{l+1} + d_l d_{l+1}a_{l+2}}{d_{l+1}d_{l+2} + d_l d_{l+2} + d_l d_{l+1}}$$

Make f←f−(r−1).
Start sampling the data at sampling points f+i+20, f+i+21, f+i+22 . . . to obtain a sampled sequence $w = w_0, w_1, w_2, \ldots$ Apply maximum likelihood decoding to w to obtain an estimate of x.

Example 2.2

As an example of Algorithm 2.2, similarly to Example 2.1, assume a string:

. . . 1111, u, x=( . . . 1111101101111111011011111010 10 . . . ), where u was defined in (1). Precoding this string, we obtain $$\frac{1}{1 \oplus D^2}(\ldots 1111, , \underline{u}, \underline{x}) = (\ldots 1100100100110010010010001000 \ldots)$$

Next, assuming that sampling of the precoded string starts at the unknown initial point 1.97, the following samples are obtained:

−0.97 −0.05 0.96 0.06 −1.03 0.96 0.06 −1.03 0.94 1.04
−0.95 −1.05 0.96 0.06 −1.03 0.96 0.06 −1.03 0.94 1.04
−0.95 −1.03 −0.04 0.98 0.06 −1.01 −0.04 0.98
0.04 . . .

By adding white gaussian noise with a variance of 0.06 to the samples above, for instance, the following samples may be obtained:

−0.96 −1.01 0.98 0.2 −0.96 1.02 −0.04 −0.92 0.86 0.94
−0.87 −1.1 0.92 0.04 −1.09 0.87 0.01 −1.09 0.99 0.96
−0.96 −0.99 0.02 0.94 0.12 −1.03 −0.12 1.01
0.08 . . . =$v_0$ $v_1$ . . .

. . .

By applying at each step the algorithm, notice that for each $0 \leq j \leq 7$ and $v_i = (v_i, v_{i+i}, \ldots, v_{i+15})$, $d_{i,j} = d(v_i, u_j)$ gives:

| i | $d_{i,0}$ | $d_{i,1}$ | $d_{i,2}$ | $d_{i,3}$ | $d_{i,4}$ | $d_{i,5}$ | $d_{i,6}$ | $d_{i,7}$ |
|---|---|---|---|---|---|---|---|---|
| 0 | 40.44 | 36.57 | 31.75 | 26.82 | 21.76 | 16.8 | 12.31 | 8.86 |
| 1 | 32.23 | 36.81 | 40.22 | 42.97 | 44.37 | 44.33 | 43.01 | 40.85 |
| 2 | 0.14 | 1.13 | 3.36 | 6.79 | 11.11 | 16.11 | 21.61 | 27.17 |
| 3 | 29.98 | 24.76 | 19.22 | 14 | 9.24 | 5.21 | 2.19 | 0.5 |

Notice that, according to Algorithm 2.2, $d_{i,j} \leq 2$ is achieved at i=2, so $$\underline{d} = (d_{i+1,0}, d_{i+1,1}, \ldots, d_{i+1,7}, d_{i,0}, d_{i,j}, \ldots, d_{i,7})$$

$$= (29.98, 24.76, 19.22, 14, 9.24, 5.21, 2.19, 0.5,$$

$$0.14, 1.13, 3.36, 6.79, 11.11, 16.11, 21.61, 27.17)$$

Manifestly, l=7, thus, $(a_l, a_{l+1}, a_{l+2})=(0.875, 1, 1.125)$ and $(d_l, d_{l+1}, d_{l+2})=(0.5, 0.14, 1.13)$. This gives, $$r = \frac{d_{l+1}d_{l+2}a_l + d_ld_{l+2}a_{l+1} + d_ld_{l+1}a_{l+2}}{d_{l+1}d_{l+2} + d_ld_{l+2} + d_ld_{l+1}} = 0.99$$

Since the initial (unknown) sampling point was 1.97 and i=2, according to Algorithm 2.2, f is reset to $f \leftarrow f-(r-1)$ =1.97−(0.99 −1)=1.98 and sampling starts at points $$f+i+20, f+i+21, f+i+22 \ldots = 23.98, 24.98, 25.98, \ldots$$

Again, notice that for perfect bit-byte synchronization, one would need to sample at points 24, 25, 26, . . .

Figure 5:
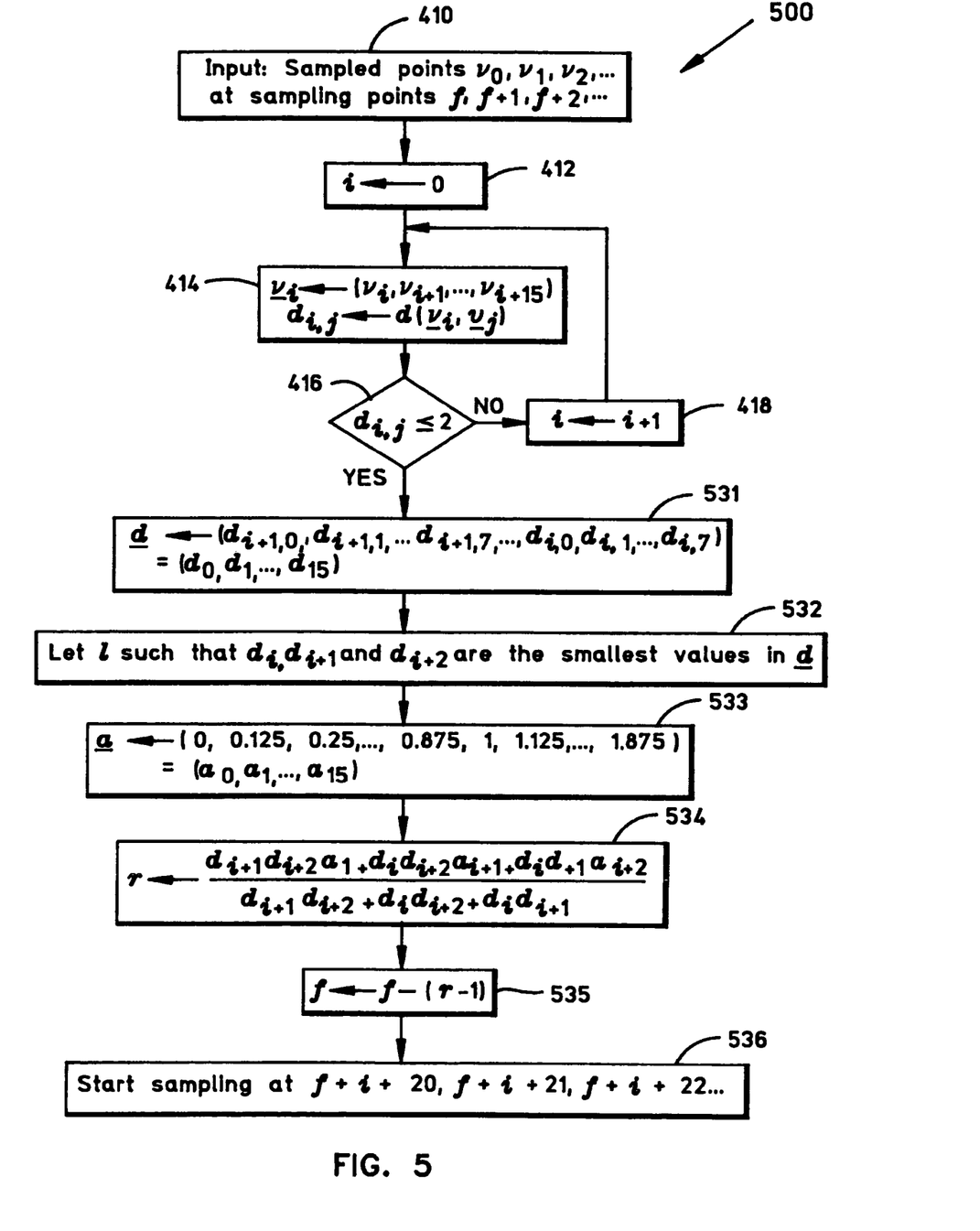
FIG. 5 is a flow diagram illustrating a second embodiment of the method of the invention.

FIG. 5 illustrates a method 530 according to Algorithm 2.2. The method is represented by a flow diagram with the understanding that it would be embodied either as a processor program comprising a series or sequence of commands executed by the synchronizer 310 of FIG. 2. Preferably, the method 530 operates on a string . . .1111, u, x, and is preceded by pre-coding the string as discussed above, which produces the pre-coded data string y. The method begins in step 410 by sampling the string to obtain the sample vectors $v_0, v_1, v_2, \ldots$ at the sampling points f, f+1, f+2, . . . before the start of u. An iteration counter i is initialized in step 412. Then, in step 414 the Euclidian distance $d_{ij}$ is taken between a current sample vector $v_i$ and each of eight sample vectors of u. According to the test in step 416, if the Euclidian distance $d_{i,j}$ is greater than 2, the method increments i by one and loops back through 414; otherwise, the method goes to step 531. In step 531, a vector d of sixteen Euclidian distances is calculated with $v_i$ and $u_j$ and the three smallest values of d are selected in step 532. The sixteen unit vector a is accessed in step 533 and the elements of a at the same vector locations as the three smallest values of d are combined with the three smallest values of d in step 534 to obtain a value r representing interpolation among the three smallest values of d. The value of r is used to adjust the initial sampling point f in step 535. With the adjustment, a sampled sequence w is obtained in step 536 from which an estimate of the data string x is derived by maximum likelihood decoding.

The next algorithm introduces a modification that makes it slightly more efficient than Algorithm 2.2.

Algorithm 2.3 Assume the string . . . 1111, u, x, where u was defined in (1) and x is random data. This string is precoded by convolution with $1/(1 \oplus D^2)$ and PRML sampling of the precoded string starts at points f, f+1, f+2, . . . before the start of u, where the initial sampling point f is random and unknown. The sampled signal will be possibly subject to noise. Denote this sampled and possibly noisy signal by $v_0, v_1, v_2, \ldots$ Then, proceed as follows:
Set
i←0
BACK: For each $0 \leq j \leq 7$, let $v_i = (v_i, v_{i+1}, \ldots, v_{i+15})$ and $d_{i,j} = d(v_i, u_j)$.
If $d_{i,j} \leq 2$, then go to NEXT, else,
Set if i←i+1 and go to BACK.
NEXT: Consider the vector of distances of length 16

$$\underline{d} = (d_{i+1,0}, d_{i+1,1}, \ldots, d_{i+1,7}, d_{i,0}, d_{i,1}, \ldots, d_{i,7})$$

$$(d_0, d_1, \ldots, d_{15})$$

Consider 1, $0 \leq l \leq 13$ such that $d_{l+1}$ is the smallest value in d and, without loss of generality, $d_l$, $d_{l+1}$, and $d_{l+2}$ are the three smallest values in d. Consider the vector of length 16:

$$\underline{a} = (0, 0.125, 0.25, \ldots, 0.875, 1, 1.125, \ldots, 1.875)$$

$$= (a_0, a_1, \ldots, a_{15})$$

If $d_{l+2} \leq 2d_l$ or $d_l \leq 2d_{l+2}$, let $$r = \frac{d_{l+1}d_{l+2}a_l + d_ld_{l+2}a_{l+1} + d_ld_{l+1}a_{l+2}}{d_{l+1}d_{l+2} + d_ld_{l+2} + d_ld_{l+1}}$$

Otherwise, let $$r = \frac{d_{l+1}a_l + d_la_{l+1}}{d_la_{l+1}}$$

Make $f \leftarrow f-(r-1)$.

Start sampling the data at sampling points f+i+20, f+i+21, f+i+22 . . . to obtain a sampled sequence $w=w_0, w_1, w_2, \ldots$ Apply maximum likelihood decoding to w to obtain an estimate of x.

Example 2.3

This example describes the same situation as Example 2.2, where $1=7$, $(a_l, a_{l+1}, a_{l+2})=(0.875, 1, 1.125)$ and $(d_l, d_{l+1}, d_{l+2})=(0.5, 0.14, 1.13)$. Notice that $d_{l+2}=1.3>2(0.5)=2d_l$. Thus, according to Algorithm 2.3:

$$r = \frac{d_{l+1}a_l + d_la_{l+1}}{d_la_{l+1}} = 0.97$$

Since the initial (unknown) sampling point was 1.97 and i=2, according to Algorithm 2.3, f is reset according to $f \leftarrow f-(r-1)=1.97-(0.97-1)=2$ and sampling starts at points $$f+i+20, f+i+21, f+i+22 \ldots = 24, 25, 26, \ldots$$

Thus, perfect bit-byte synchronization occurs in this case.

Figure 6:
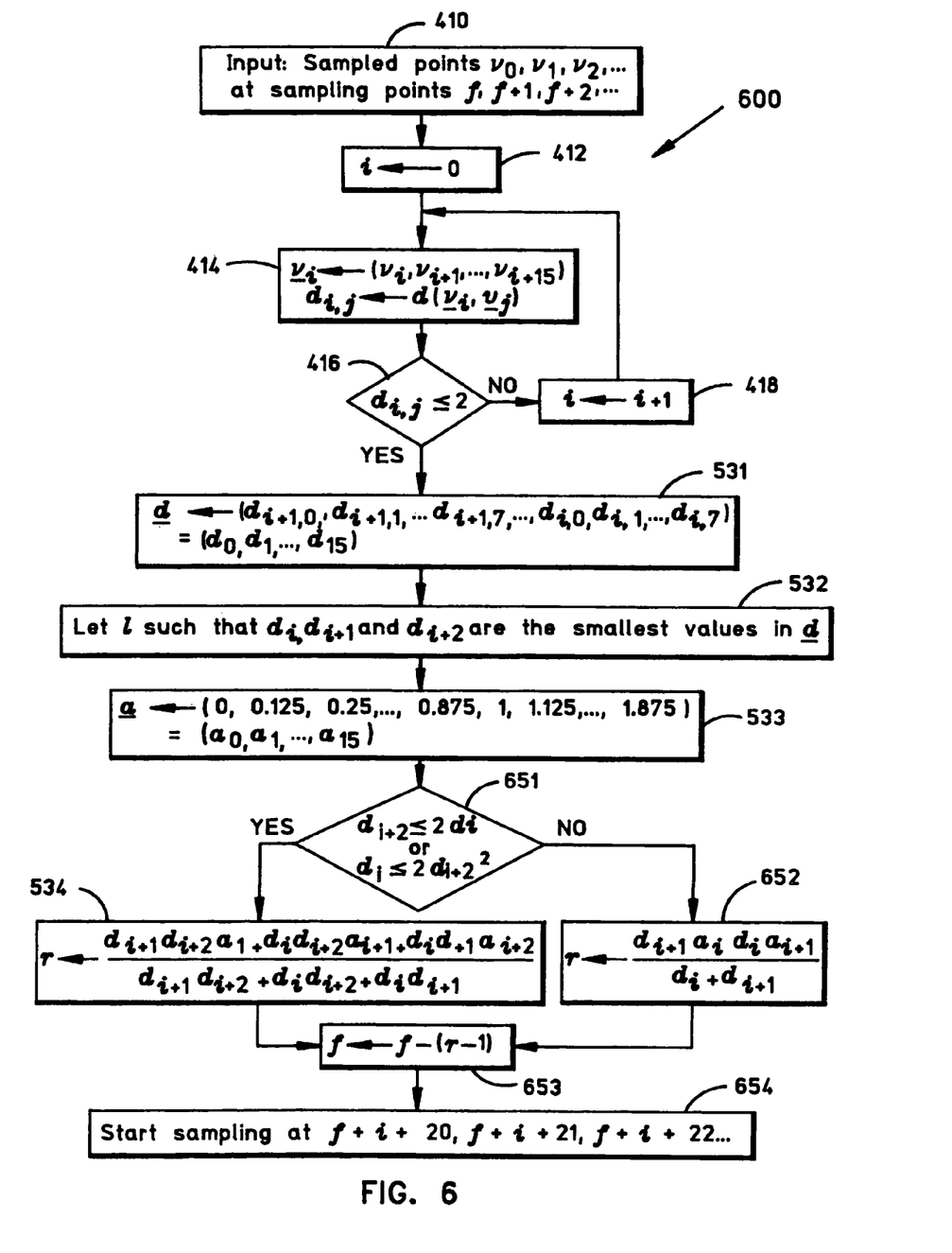
FIG. 6 is a flow diagram illustrating a third embodiment of the method of the invention.

FIG. 6 illustrates a method 650 according to Algorithm 2.3. The method is represented by a flow diagram with the understanding that it would be embodied either as a processor program comprising a series or sequence of commands executed by the synchronizer of FIG. 152. Preferably, the method 650 operates on a string . . . 1111, u, x, and is preceded by pre-coding the string as discussed above, which produces the pre-coded data string y. The method begins in step 410 by sampling the string to obtain the sample vectors $v_0, v_1, v_2, \ldots$ at the sampling points $f, f+1, f+2, \ldots$ before the start of u. An iteration counter i is initialized in step 412. Then, in step 414 the Euclidian distance $d_{i,j}$ is taken between a current sample vector $v_i$ and each of eight sample vectors of u. According to the test in step 416, if the Euclidian distance $d_{i,j}$ is greater than 2, the method increments i by one and loops back through 414; otherwise, the method goes to step 531. In step 531, a vector d of sixteen Euclidian distances is calculated with $v_i$ and $u_j$ and the three smallest values of d are selected in step 532. The sixteen unit vector a is accessed in step 533 and the elements of a at the same vector locations as the three smallest values of d are obtained. In decision 651, the first and third of the three smallest values of d are compared. If the variance between the two values exceeds a threshold, r is calculated in step 534 by interpolation among the three smallest values of d as in FIG. 3C. Otherwise, r is calculated in step 652 by interpolation between only the two smallest values of d. The value of r is used to adjust the initial sampling point f in step 653. With the adjustment, a sampled sequence w is obtained in step 654 from which an estimate of the data string x is derived by maximum likelihood decoding.

Representative simulation results obtained using Algorithms 2.1, 2.2 and 2.3 are tabulated below. In all cases, white Gaussian noise with a variance of 0.06 was added. A number of tests were run for each algorithm and for each case to measure how far away the results were from perfect bit-synchronization (byte synchronization was correct in all cases). For instance, in Example 2.1 this number is 0.025, in Example 2.2 it is 0.02 and in Example 2.3 it is is 0. The average of all these numbers, the standard deviation, the worst case and the percentage of cases above 0.05 are shown in the following table.

| Algorithm | Variance of AWGN | Number of Tests | Average bit Synch Error | Standard Deviation | Worst Case | Percentage above 0.05 |
| --- | --- | --- | --- | --- | --- | --- |
| 2.1 | 0.06 | 437018 | 0.03 | 0.02 | 0.1 | 15% |
| 2.2 | 0.06 | 100190 | 0.015 | 0.01 | 0.06 | 0.006% |
| 2.3 | 0.06 | 255355 | 0.01 | 0.008 | 0.06 | 0.001% |

The invention claimed is:

1. A method for synchronization of data detection with a stream of encoded digital data, comprising:
  establishing u where u is a predetermined bit-byte synchronization pattern of bits;
  obtaining a plurality of vectors $u_j$ by sampling u at predetermined PRML (partial-response, maximum-likelihood) phases;
  receiving a string of digital data y, where y = . . . 1111, u, x, and x is a string of PRML-encoded data;
  producing from y a string of samples v at sampling points $f, f+1, f+2, \ldots$ before the start of u;
  determining a plurality of Euclidian distances $d_{i,j}$ between a sequence $v_i$ of samples and each of the vectors $u_j$;
  finding a minimum Euclidian distance of the plurality of Euclidian distances;
  calculating a correction value based on the minimum Euclidian distance;
  correcting the sampling points by the correction value; and
  sampling y at the corrected sampling points.

2. The method of claim 1, wherein the string of digital data is a precoded string of digital data $(1/(1 \oplus D^2)) \cdot y$, where $\oplus$ denotes modulo-2 addition.

3. The method of claim 2, wherein the determining step includes:
  if a first of the plurality of Euclidian distances exceeds a predetermined threshold, incrementing i and repeating the determining step; otherwise,
  denominating the first Euclidian distance as a first minimum Euclidian distance $m_i$; and then:
  i. finding the next minimum Euclidian distance $m_{i+1}$ following the first Euclidian distance; and
  ii. if $m_i > m_{i+1}$ incrementing i and repeating step i; otherwise
  iii. denominating $m_i$ as the minimum Euclidian distance of the plurality of Euclidian distances.

4. The method of claim 3, wherein:
  the calculating step includes denominating $j_0$ such that the minimum Euclidian distance of the plurality of Euclidian distances is $m_i = d_{ij0}$; and
  the correcting step includes correcting f by $f \leftarrow f - (j_0/8)$ such that the corrected sampling points are $f+i+n$, $f+i+(n+1)$, $f+i+(n+2)$.

5. The method of claim 4, further including:
  producing a sampled sequence $w = w_0, w_1, w_2, \ldots$ by sampling the pre-coded string at the corrected sampling points; and
  applying maximum likelihood decoding to w to obtain an estimate of x.

6. The method of claim 2, wherein the determining step includes:
  if a first of the plurality of Euclidian distances exceeds a predetermined threshold, incrementing i and repeating the determining step; otherwise,
  performing the finding step by assembling a group of minimal Euclidian distances in the plurality of Euclidian distances.

7. The method of claim 6, wherein:
  the calculating step includes interpolating among the group of minimal Euclidian distances, and denominating the result, r, of the interpolating step as the minimum Euclidian distance of the plurality of Euclidian distances,
  the correcting step includes correcting f by $f \leftarrow f - (r-1)$ such that the corrected sampling points are $f+i+n$, $f+i+(n+1)$, $f+i+(n+2)$.

8. The method of claim 7, further including:
  producing a sampled sequence $w = w_0, w_1, w_2, \ldots$ by sampling the pre-coded string at the corrected sampling points; and
  applying maximum likelihood decoding to w to obtain an estimate of x.

9. The method of claim 7, wherein the calculating step includes:
  testing values in the group of minimal Euclidian distances to determine a range of minimal Euclidian distances;
  if the range exceeds a predetermined value, interpolating among the group of minimal Euclidian distances, and denominating the result, r, of the interpolating step as the minimum Euclidian distance of the plurality of Euclidian distances; otherwise
  interpolating among selected minimal Euclidian distances in the group of minimal Euclidian distances, and denominating the result, r, of the interpolating step as the minimum Euclidian distance of the plurality of Euclidian distances.

10. The method of step 9, wherein the correcting step includes correcting f by
f←f−(r−1) such that the corrected sampling points are f+i+n, f+i+(n+1), f+i+(n +2).

11. The method of claim 10, further including:
producing a sampled sequence w=$w_0$, $w_1$, $w_2$, . . . by sampling the pre-coded string at the corrected sampling points; and
applying maximum likelihood decoding to w to obtain an estimate of x.

12. In a data storage apparatus, a data synchronization procedure comprising:
establishing u, where u is a predetermined bit-byte synchronization pattern of bits;
obtaining a plurality of vectors $u_j$ by sampling u at predetermined PRML (partial-response, maximum-likelihood) phases;
receiving a string of digital data for storage, where the string is . . . 1111, u, x, and x is a string of PRML-encoded data;
pre-coding the string of digital data with $(1/(1 \oplus D^2))$ to produce a pre-coded string y, where $\oplus$ denotes modulo-2 addition;
storing y on a data storage medium in the storage apparatus;
reading y from the storage medium as a string of samples v at sampling points f, f+1, f+2, . . . before the start of u;
determining a plurality of Euclidian distances $d_{ij}$ between a sequence $v_i$ of samples and each of the vectors $u_j$;
finding a minimum Euclidian distance of the plurality of Euclidian distances;
calculating a correction value based on the minimum Euclidian distance;
correcting the sampling points by the correction value; and
sampling y at the corrected sampling points.

13. The procedure of claim 12, further including:
producing a sampled sequence w=$w_0$, $w_1$, $w_2$, . . . by sampling y at the corrected sampling points; and
applying maximum likelihood decoding to w to obtain an estimate of x.

14. The procedure of claim 13, wherein the determining step includes:
if a first of the plurality of Euclidian distances exceeds a predetermined threshold, incrementing i and repeating the determining step; otherwise,
denominating the first Euclidian distance as a first minimum Euclidian distance $m_i$; and then:
i. finding the next minimum Euclidian distance $m_{i+1}$ following the first Euclidian distance; and
ii. if $m_i > m_{i+1}$ incrementing i and repeating step i; otherwise
iii. denominating $m_i$ as the minimum Euclidian distance of the plurality of Euclidian distances.

15. The procedure of claim 14, wherein:
the calculating step includes denominating $J_0$ such that the minimum Euclidian distance of the plurality of Euclidian distances is $m_i = d_{i,j0}$; and
the correcting step includes correcting f by f←f−($j_0$/8) such that the corrected sampling points are f+i+n, f+i+(n+1), f+i+(n+2).

16. The procedure of claim 13, wherein the determining step includes:
if a first of the plurality of Euclidian distances exceeds a predetermined threshold, incrementing i and repeating the determining step; otherwise,
performing the finding step by assembling a group of minimal Euclidian distances in the plurality of Euclidian distances.

17. The procedure of claim 16, wherein:
the calculating step includes interpolating among the group of minimal Euclidian distances, and denominating the result, r, of the interpolating step as the minimum Euclidian distance of the plurality of Euclidian distances,
the correcting step includes correcting f by f←f−(r+1) such that the corrected sampling points are f+i+n, f+i+(n+1), f+i+(n+2).

18. The procedure of claim 17, wherein the calculating step includes:
testing values in the group of minimal Euclidian distances to determine a range of minimal Euclidian distances;
if the range exceeds a predetermined value, interpolating among the group of minimal Euclidian distances, and denominating the result, r, of the interpolating step as the minimum Euclidian distance of the plurality of Euclidian distances; otherwise
interpolating among selected minimal Euclidian distances in the group of minimal Euclidian distances, and denominating the result, r, of the interpolating step as the minimum Euclidian distance of the plurality of Euclidian distances.

19. The procedure of claim 18, wherein the correcting step includes correcting f by
f←f−(r−1) such that the corrected sampling points are f+i+n, f+i+(n+1), f+i+(n +2).

20. The procedure of claims 15, 17, and 19, wherein n=20.

* * * * *

UNITED STATES PATENT AND TRADEMARK OFFICE
CERTIFICATE OF CORRECTION

PATENT NO.      : 7,388,938 B2           Page 1 of 2
APPLICATION NO. : 10/856706
DATED           : June 17, 2008
INVENTOR(S)     : Blaum et al.

Correct form of claims 4, 7, 10, 12, 15, and 17

Delete column 10 lines 17-23 (claim 4), and insert correct form of claim 4

--4. The method of claim 3, wherein:
   the calculating step includes denominating $j_0$ such that the minimum Euclidian distance of the plurality of Euclidian distances is $m_i = d_{i,j0}$; and
   the correcting step includes correcting $f$ by $f \leftarrow f - (j_0/8)$ such that the corrected sampling points are $f + i + n$, $f + i + (n+1)$, $f + i + (n+2)$ . . . .--

Delete column 10 lines 39-47 (claim 7), and insert correct form of claim 7

--7. The method of claim 6, wherein:
   the calculating step includes interpolating among the group of minimal Euclidian distances, and denominating the result, $r$, of the interpolating step as the minimum Euclidian distance of the plurality of Euclidian distances; and,
   the correcting step includes correcting $f$ by $f \leftarrow f - (r - 1)$ such that the corrected sampling points are $f + i + n$, $f + i + (n+1)$, $f + i + (n+2)$ . . . .--

Delete column 11 lines 1-4 (claim 10), and insert correct form of claim 10

--10. The method of step 9, wherein the correcting step includes correcting $f$ by:
   $f \leftarrow f - (r - 1)$ such that the corrected sampling points are $f + i + n$, $f + i + (n+1)$, $f + i + (n+2)$ . . . .--

Delete column 11 lines 11-37 (Claim 12), and insert correct form of claim 12

--12. In a data storage apparatus, a data synchronization procedure comprising:
   establishing $u$, where $u$ is a predetermined bit-byte synchronization pattern of bits;
   obtaining a plurality of vectors $u_j$ by sampling $u$ at predetermined PRML (partial-response, maximum-likelihood) phases;
   receiving a string of digital data for storage, where the string is ...1111, $u$, $x$, and $x$ is a string of PRML- encoded data;

Signed and Sealed this

Thirty-first Day of August, 2010

David J. Kappos
*Director of the United States Patent and Trademark Office* pre-coding the string of digital data with $(1/(1 \oplus D^2))$ to produce a pre-coded string $\underline{y}$, where $\oplus$ denotes modulo-2 addition;

storing $\underline{y}$ on a data storage medium in the storage apparatus;

reading $\underline{y}$ from the storage medium as a string of samples $\underline{v}$ at sampling points $f, f+1, f+2, \ldots$ before the start of $\underline{u}$;

determining a plurality of Euclidian distances $d_{i,j}$ between a sequence $\underline{v}_i$ of samples and each of the vectors $\underline{u}_j$;

finding a minimum Euclidian distance of the plurality of Euclidian distances;

calculating a correction value based on the minimum Euclidian distance;

correcting the sampling points by the correction value; and     sampling $\underline{y}$ at the corrected sampling points.--

Delete column 12 lines 5-11 (claim 15), and insert correct form of claim 15

--15. The procedure of claim 14, wherein:

the calculating step includes denominating $j_0$ such that the minimum Euclidian distance of the plurality of Euclidian distances is $m_i = d_{i,j0}$; and     the correcting step includes correcting $f$ by $f \leftarrow f - (j_0/8)$ such that the corrected sampling points are $f + i + n, f + i + (n+1), f + i + (n+2) \ldots$ .--

Delete column 12 lines 21-29 (claim 17), and insert the correct form of claim 17

--17. The procedure of claim 16, wherein:

the calculating step includes interpolating among the group of minimal Euclidian distances, and denominating the result, $r$, of the interpolating step as the minimum Euclidian distance of the plurality of Euclidian distances; and,     the correcting step includes correcting $f$ by $f \leftarrow f - (r - 1)$ such that the corrected sampling points are $f + i + n, f + i + (n+1), f + i + (n+2) \ldots$ .--